Jan. 26, 1943.  L. I. BAGLEY  2,309,231
CAN LEAK DETECTOR
Filed April 29, 1940  3 Sheets-Sheet 1
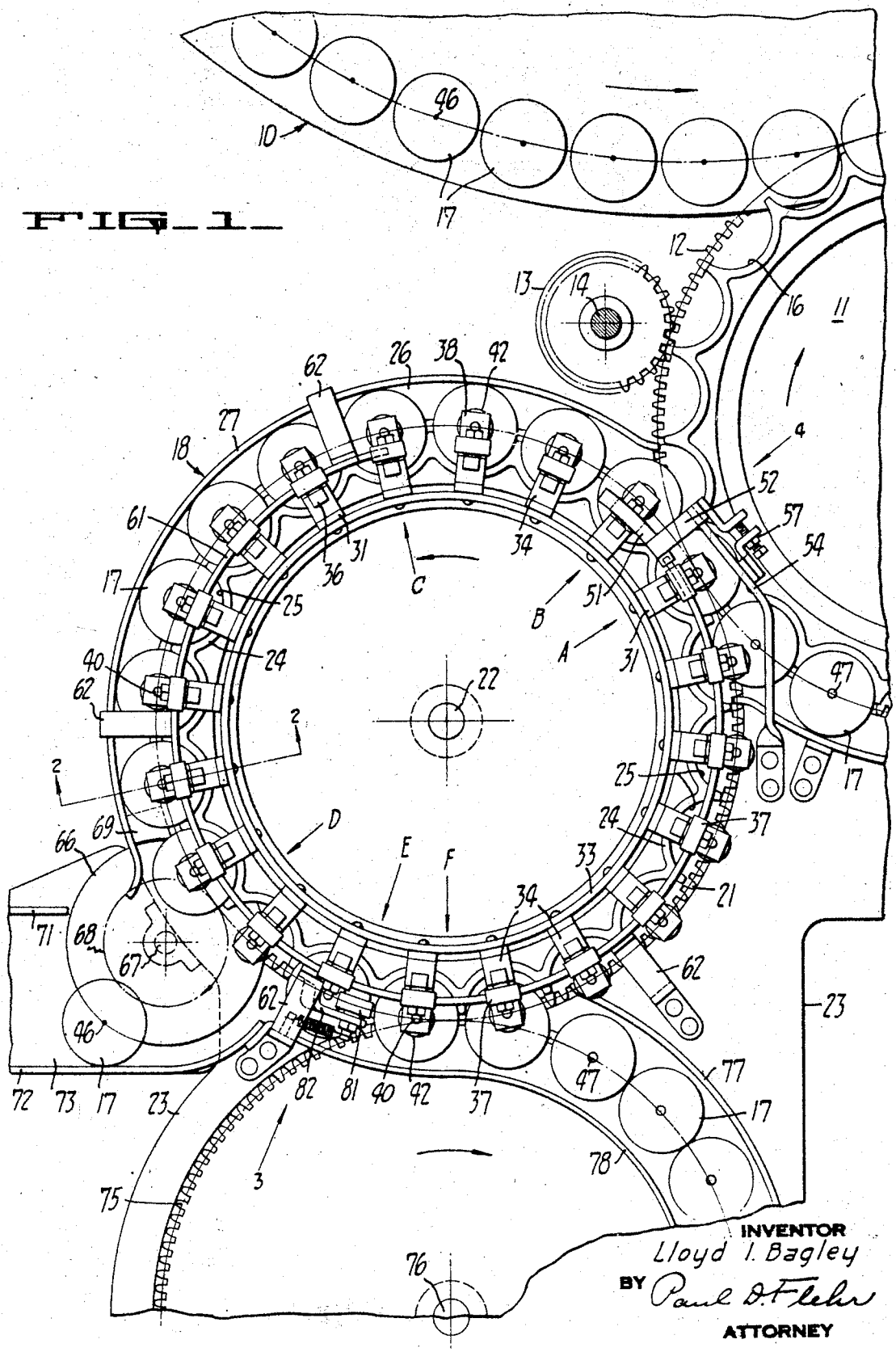
FIG_1_
INVENTOR
Lloyd I. Bagley
BY Paul D. Flehr
ATTORNEY

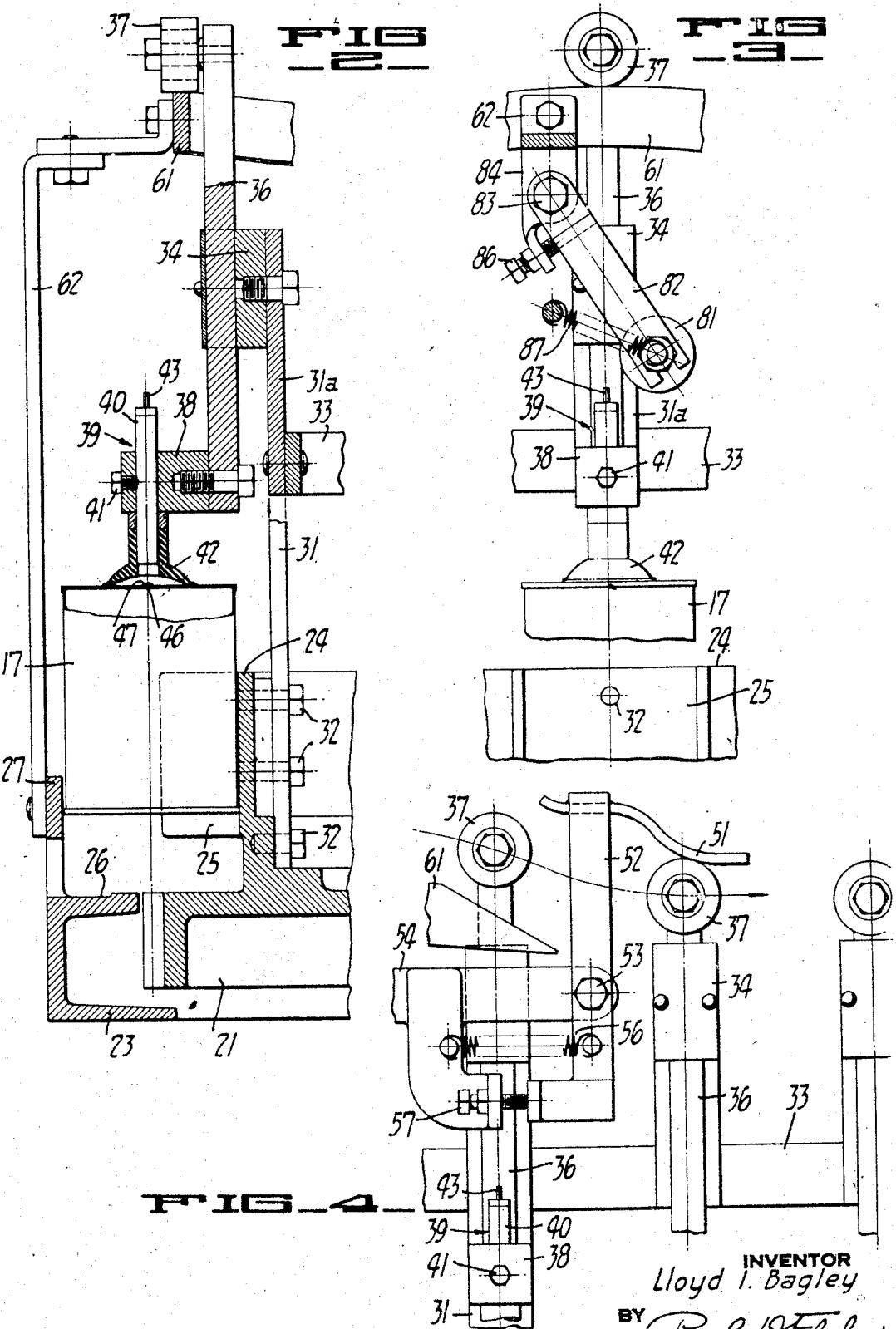

Jan. 26, 1943.   L. I. BAGLEY   2,309,231
CAN LEAK DETECTOR
Filed April 29, 1940   3 Sheets-Sheet 3
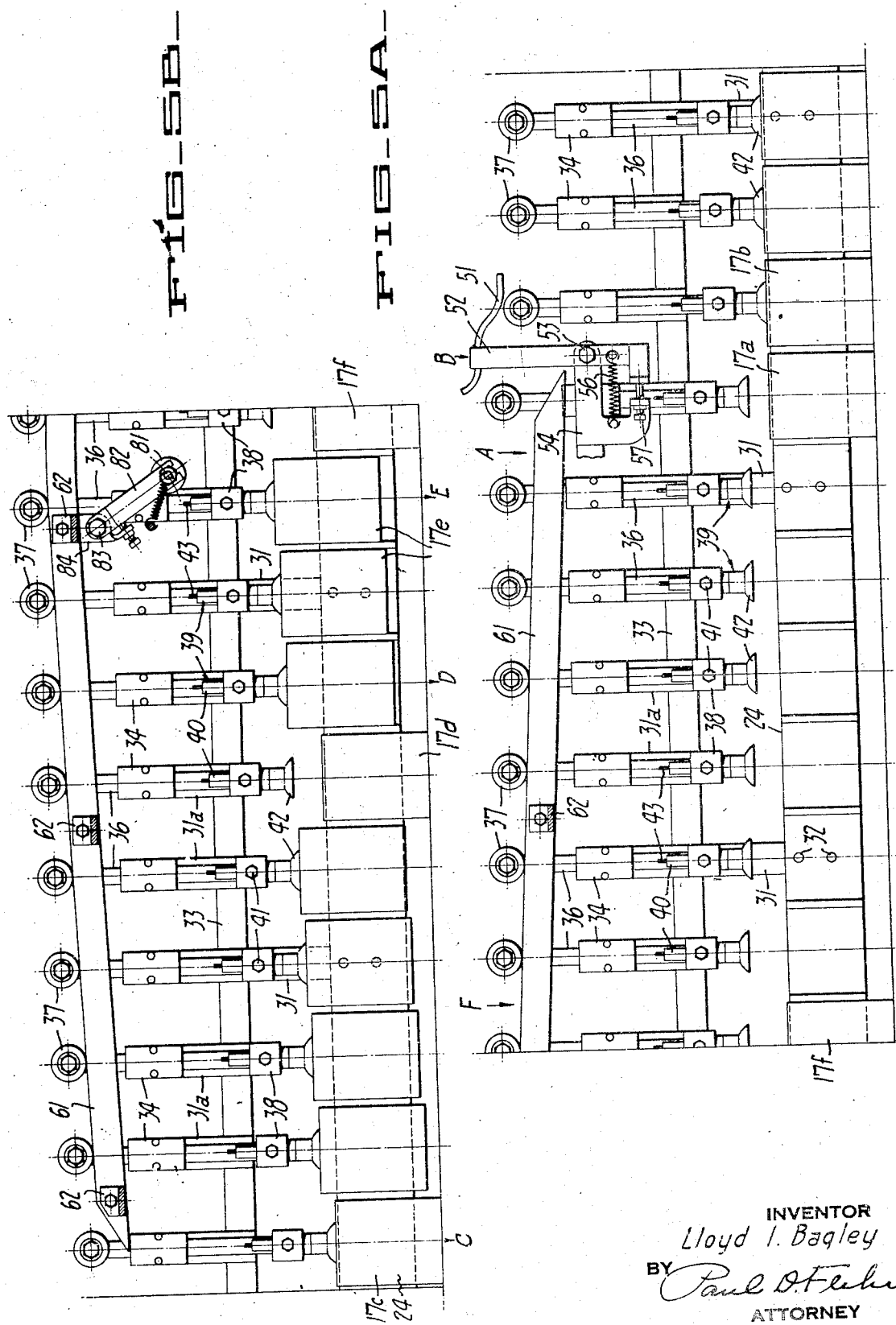
INVENTOR
Lloyd I. Bagley
BY
ATTORNEY Patented Jan. 26, 1943

2,309,231

UNITED STATES PATENT OFFICE 2,309,231

CAN LEAK DETECTOR

Lloyd I. Bagley, Hanford, Calif.

Application April 29, 1940, Serial No. 332,147

10 Claims. (Cl. 73—51)

This invention relates to can leak detectors and is concerned more particularly with the provision of an improved can leak detector which is especially adapted for use with filled cans of the type having a small central aperture in one end surface which is closed after filling by a soldering or "tipping" operation.

In certain canning operations, for example in canning milk, it is customary to use can filling machinery for injecting the liquid through a small central aperture in one end of the can, while the cans are in upright position, and for thereafter closing the aperture with a drop of solder. The latter operation is commonly referred to as "tipping." In the tipping operation, the solder is often applied in a faulty manner so as to provide a leaky can. Also quite often several cans go through the tipper without having any solder applied thereto during the time when the soldering flux is being renewed.

In order to detect and separate such leaky cans from the airtight cans, it has been customary to pass the cans after the tipping operation through a water bath to detect the presence of leaky cans by the presence of air bubbles, and said leaky cans are manually removed from the line of cans being processed. In other instances, attempts have been made to detect such leaks by passing the cans through special equipment wherein the cans are turned on their sides to be carried through the testing machine. Such operations are obviously undesirable and have certain inherent defects.

In accordance with the instant invention, an automatic can leak detector is provided wherein the cans are tested while in upright position, so that there is no possibility of spilling the contents of the cans if the aperture has not been closed, and without the use of a water bath so that there is no danger of leakage of water into the cans.

It is a general object of the invention to provide an improved can leak detector which operates automatically to separate leaky from airtight cans after the filling operation.

Another object of the invention is to provide a can leak detector of the character referred to which is vacuum operated and which retains the cans in their normal upright positions and can thereby be incorporated readily in conventional can-filling machinery now in use.

Another object of the invention is to provide a can leak detector in which a continuous testing operation is performed with means for bypassing airtight cans past a discharge point for leaky cans.

Other objects of the invention will be apparent from the following description of a preferred embodiment thereof, as illustrated in the accompanying drawings, in which:

Figure 1 is a plan view of apparatus embodying my invention with certain conventional portions thereof shown schematically.

Figure 2 is a sectional elevational view of the apparatus shown in Figure 1, and is taken in a plane indicated by the line 2—2 in Figure 1.

Figure 3 is a fragmentary elevational view taken as indicated by the arrow 3 in Figure 1.

Figure 4 is a fragmentary elevational view taken as indicated by the arrow 4 in Figure 1.

Figures 5A and 5B when taken together show a developed elevational view illustrating a complete operating cycle in a diagrammatic fashion.

The can leak detector of my invention can be employed with conventional filling and tipping machines such as disclosed, for example, in the patents to Dickerson Nos. 1,365,773 and 1,365,774, respectively.

Referring to Figure 1, a can filler of the type shown in the Dickerson Patent 1,365,773 is indicated generally at 10, while a tipper of the Dickerson type is indicated at 11. The tipper may include a turret wheel 12 driven by gear 13 from a drive shaft 14 and having an endless series of peripheral pockets 16 for receiving the cans 17 from the filler 10. The gear 12 rotates in a clockwise direction as viewed in Figure 1, so that the cans are carried around the periphery thereof and tipped before arriving at a discharge point where they are transferred to the can leak detector indicated generally at 18.

The can leak detector 18 may include a turret gear 21 mounted for rotation on an upright shaft 22 suitably journaled in a frame 23. The turret gear 21 has an upright flange 24 formed with a series of can receiving pockets 25 (Figs. 1 and 2) which are adapted to receive and hold cans in upright position with the cans resting on the upper surface of gear 21. The frame 23 may be formed in part as a ledge 26 extending around the gear, 21 from the tipper 11 to the discharge points of the cans as referred to hereinafter. If desired, a retaining rail 27 may be suitably supported on the ledge 26. The ledge 26 and rail 27 serve to prevent displacement of cans from the pockets 25 during their travel with the turret gear 21.

A series of vacuum lifters are carried by the turret gear 21, one for each pocket 24, and each lifter is mounted for vertical movement to and from engagement with a can under the control of cam means as described hereinafter.

To support the series of lifters, there are associated with the pockets 25 a series of upright straps or brackets 31 and 31a. Brackets 31 (Fig. 2) are secured to flange 24 of the gear 21 as by bolts 32. The brackets 31 are connected by a bracing ring 33 which carries brackets 31a. At its upper end, each bracket 31 and 31a carries a vertically apertured guide bearing 34 suitably bolted thereon to receive a vertical arm 36 of the associated lifter. At its upper end, each arm 36 carries a journaled roller 37 for engagement with the cam control means as referred to hereinafter, and at its lower end carries a mounting block 38 for a vacuum lifter element 39 comprising an upright tube 40 secured in the mounting block 38 as by a clamp screw 41 and carrying a resilient vacuum suction cup 42 at its lower end. Vacuum cup 42 is of any suitable resilient material such as rubber and has a concave bottom face for engagement with the end surface of a can. The upper end of tube 40 is normally closed by an air valve 43 of conventional construction having its stem projecting upwardly from the tube 40.

Means are provided for engaging the vacuum cup 42 of each lifter with the can aligned therewith, the lifter being centered with respect to the associated can so that the aperture 46 thereof (Figure 2) together with its tip 47 of solder, will be in the can surface engaged by the cup. Means are provided for first engaging the suction cup 42 of each lifter with the aligned can and then for subsequently raising the lifter to apply a lifting force to the cans. If a perfect seal is made, the can will be lifted, while if a leak is present around the solder or if no solder has been applied, the vacuum will not be maintained or will be sufficiently weak because of the air or vapor within the can, so that the can will either not be lifted or will shortly thereafter be dropped from the lifter.

As seen in Figure 4, the roller 37 of each lifter is adapted for engagement with a depressing cam 51 carried by an arm 52 pivoted at 53 on a frame bracket 54. Arm 52 is urged in a clockwise direction by spring 56 against an adjustable stop screw 57 suitably mounted on the bracket 54. Spring 56 is of sufficient strength to insure flattening of the suction cups 42 when applied to the cans, but will yield in the event of an obstruction to downward movement of the lifter. As seen in Figure 1, cam 51 is located to depress the lifters immediately after the can has been placed in a pocket 25, so that the first operation after a can has been received by the turret gear 21 at feed position A (Figures 1 and 5A) is a depression of the lifter arm at the position B to engage the vacuum cup 42 of the lifter with the top surface of the can. After engagement of the lifter with a can, a lifting means is provided in the form of a circular cam track 61 for elevating the lifter and to thereby also exert a lifting force on the can with which the lifter is engaged. Cam track 61 may be suitably supported on the frame by upright arms 62 extending upwardly from can retaining rail 27. The cam track 61 extends from the point C past a leaky can removal point D, a vacuum release point E and a discharge point F for airtight cans to the point A. The cam track 61 as seen in Figures 5A and 5B gradually rises from point C to points D and E and then descends to adjacent the point B.

As seen in Figure 1, two points of discharge or removal are provided at D and F for cans from the can leak detector 10. At point D, leaky cans are removed by means of a rotating cam disc 66 mounted for rotation on an upright shaft 67 suitably carried on the frame and having a gear 68 meshing with turret gear 21 to be driven thereby. The disc 66 is preferably of thin construction and extends over the gear 21. To guide leaky cans onto the disc, the guide ledge 26 rises gradually as at 69 to the level of the disc 66. Associated with the disc 66 are a pair of guide rails 71 and 72 for guiding the cans removed from the can leak detector by the disc 66 onto a table or track 73.

The second of the discharge means comprises a discharge or transfer gear 75 meshing with the gear 21 and mounted for rotation about an upright axis 76. Associated with the transfer gear 75 are a pair of guide rails 77 and 78, respectively.

Means are provided for releasing the vacuum on airtight cans after they pass the leaky can remover 66 and before they arrive at the discharge gear 75. This means may be in the form of a roller 81, Figure 3, journaled in the lower end of an arm 82 pivoted at 83 on a bracket 84 depending from the cam track 61. The arm 82 is urged against an adjustable stop 86 by means of a tension spring 87. The height of the roller 81 is such that it will engage and depress the air valve 43 to relieve the vacuum within the vacuum cup 42 and thereby cause dropping of the cans at the point E as shown in Figure 1 just prior to the engagement of the cans with the discharge gear 75.

The operation of the device may be briefly described as follows: Referring to Figure 5A, filled and tipped cans are fed to turret gear 21 at position A as indicated at 17a, immediately ahead of the depressing cam 51. Thereafter as a can travels to the position indicated at 17b, the associated lifter 39 is depressed by cam 51 to engage the vacuum cup 42 with the top surface of the can, after which the can travels to position C, indicated by can 17c, the point of pick-up by the cam track 61 for operating the lifter. All airtight cans will be lifted clear of the turret gear 21, while any leaky cans will not be lifted as shown at 17d, or if partially lifted will be dropped before arrival at the point D for removal by the discharge disc 66 for leaky cans. Airtight cans are held in elevated position by the associated lifter 39 and are by-passed over disc 66 as shown at 17e. When the can 17e, for example, arrives at position E (Figure 5B), the air valve 43 is depressed by the roller 81 to relieve the vacuum which holds the can on the lifter. After such release, the can is dropped to the position shown at 17f for removal by the transfer gear 75 for airtight cans.

I claim:

1. In a can leak detector, a can conveying turret mounted for rotation about an upright axis, said turret having an endless series of pockets for receiving cans in upright position, means for feeding cans to said turret, means for discharging air-tight cans from said turret, means disposed intermediate said feeding means and said discharging means for removing leaky cans from said turret, a series of vacuum lifters mounted on said turret in vertical alignment with said series of pockets, means for successively depressing said lifters into engagement with the top end surfaces of cans in said pockets before arrival at said removing means, means for operating said lifters before arrival at said removing means to effect lifting of air-tight cans to by-pass said removing means, and means for thereafter releasing cans from said lifters before arrival at said discharging means.

2. In a can leak detector, a can conveying turret mounted for rotation about an upright axis, said turret having an endless series of pockets for receiving cans in upright position, means for feeding cans to said turret, means for discharging air-tight cans from said turret, means disposed intermediate said feeding means and said discharging means for removing leaky cans from said turret, a series of vacuum lifters mounted on said turret in vertical alignment with said series of pockets, means for successively depressing said lifters into engagement with the top end surfaces of cans in said pockets before arrival at said removing means, and means for operating said lifters before arrival at said removing means to effect lifting of air-tight cans to by-pass said removing means.

3. In a can leak detector, a can conveying turret mounted for rotation about an upright axis, said turret having an endless series of pockets for receiving cans in upright position, means for feeding cans to said turret, means for discharging air-tight cans from said turret, means disposed intermediate said feeding means and said discharging means for removing leaky cans from said turret, a series of vacuum lifters mounted on said turret in vertical alignment with said series of pockets, means for successively depressing said lifters into engagement with the top end surfaces of cans in said pockets before arrival at said removing means, means for operating said lifters before arrival at said removing means to effect lifting of air-tight cans to by-pass said removing means, and means for thereafter releasing said cans from said lifters, said last named means comprising a vacuum relief valve on each of said lifters and means for operating said valve.

4. In a can leak detector having a can conveying turret, means for feeding cans to said turret, means for discharging air-tight cans therefrom, said turret being mounted for rotation about an upright axis and having an endless series of pockets for receiving cans in upright position, means interposed between said feeding means and said discharging means for removing leaky cans from said turret, and lifting means including a vacuum cup mounted for downward movement into operative engagement with the top surface of said cans and responsive to a leaky condition in the can to fail to lift the can, said lifting means being operatively engaged with said cans prior to the arrival of said cans at said leaky can removing means.

5. In a can leak detector, means for conveying cans in upright position, means for feeding cans to said conveying means, means for discharging air-tight cans from said conveying means, means disposed intermediate said feeding means and said discharging means for removing leaky cans from said conveying means, and leak testing means for by-passing air-tight cans past said removing means, said last-named means including a suction cup for engagement with the top end surface of a can to apply a lifting force thereto and yieldable means for forcing said cup downwardly into engagement with said top end surface.

6. In a can leak detector, a turret for conveying cans in upright position, means for feeding cans to said turret, means for discharging air-tight cans from said turret, means disposed intermediate said feeding means and said discharging means for removing leaky cans from said turret, and leak-testing means in cooperative relation with each can on said turret, each leak-testing means being mounted for vertical movement relative to said turret and including a suction cup adjacent the lower end for pressure engagement with the top end surface of a can whereby the air within the cup is forced outwardly past the lip of the cup, and a cam for engagement by each testing means during its travel with said turret to effect a depression of said testing means to force the cup into engagement with the can.

7. In a can leak detector, a turret for conveying cans in upright position, means for feeding cans to said turret, means for discharging air-tight cans from said turret, means disposed intermediate said feeding means and said discharging means for removing leaky cans from said turret, and a leak-testing means in cooperative relation with each can on said turret, each leak-testing means being mounted for vertical movement relative to said turret and including a suction cup adjacent the lower end for pressure engagement with the top end surface of a can whereby the air between the top end surface of the can and the cup is forced outwardly past the lip of the cup, a cam for engagement by each testing means during its travel with said turret to effect a depression of said testing means to force the cup into engagement with the can, and a lifting cam disposed along the path of movement of said turret means to lift said testing means and thereby apply a lifting force through the cup of each testing means to the can associated therewith.

8. In a can leak detector, means for conveying cans in upright position, means for feeding cans to said conveying means, means for discharging airtight cans from said conveying means, means disposed intermediate said feeding means and said discharging means for removing leaky cans from said conveying means, and leak testing means for by-passing airtight cans past said removing means, said last-named means including a suction cup for engagement with the top end surface of a can to apply a lifting force thereto, means for forcing said cup downwardly into engagement with said top end surface, and means for applying a lifting force to said suction cup while it is engaged with the can and prior to the arrival of said can at said removing means.

9. In a can leak detector, a can conveying turret mounted for rotation about an upright axis, said turret having an endless series of pockets for receiving cans in upright position, means for feeding cans to said turret, means for discharging airtight cans from said turret, means disposed intermediate said feeding means and said discharging means for removing leaky cans from said turret, and leak testing means for by-passing airtight cans past said removing means, said last-named means including a vacuum cup carried by said turret above said pockets for downward movement into engagement with a can positioned in the associated pocket and in engagement with said turret, means for forcing each of said cups downwardly into engagement with the top end surface of a can while the bottom of said can is resting on said turret, and means for subsequently applying a lifting force through a vacuum cup to the associated can before the can arrives at said removing means.

10. In a can leak detector, a can conveying turret mounted for rotation about an upright axis, said turret having an endless series of pockets for receiving cans in upright position, means for feeding cans to said turret, means for discharging airtight cans from said turret, means disposed intermediate said feeding means and said discharging means for removing leaky cans from said turret, and leak testing means for by-passing airtight cans past said removing means, said last-named means including a vacuum cup associated with each turret pocket for lifting airtight cans to by-pass said removing means, a depressible valve carried by said cups, means for depressing each cup to engage it with the upper surface of a can, means for applying a lifting force to each of said vacuum cups to lift an associated can before it arrives at said removing means, and means brought into play after a can has passed said removing means and before it arrives at said discharging means to operate said valve to relieve the vacuum holding the can in engagement with the vacuum cup.

LLOYD I. BAGLEY.